US011859784B1

(12) United States Patent
Li et al.

(10) Patent No.: US 11,859,784 B1
(45) Date of Patent: Jan. 2, 2024

(54) LED LIGHTING CAPABLE OF BEING BENT AND TWISTED AT WILL

(71) Applicant: Blueview Elec-optic Tech Co., Ltd, Chengdu (CN)

(72) Inventors: Zhongxun Li, Chengdu (CN); Chao Dai, Chengdu (CN)

(73) Assignee: Blueview Elec-optic Tech Co., Ltd, Chengdu (CN)

( * ) Notice: Subject to any disclaimer, the term of this patent is extended or adjusted under 35 U.S.C. 154(b) by 0 days.

(21) Appl. No.: 18/306,266

(22) Filed: Apr. 25, 2023

(30) Foreign Application Priority Data

Jun. 22, 2022 (CN) ......................... 202221570832.3

(51) Int. Cl.
*F21S 4/26* (2016.01)

(52) U.S. Cl.
CPC ....................................... *F21S 4/26* (2016.01)

(58) Field of Classification Search
CPC ......................................................... F21S 4/26
See application file for complete search history.

(56) References Cited

U.S. PATENT DOCUMENTS 11,655,946 B1 * 5/2023 Zhang ..................... F21V 31/04 362/217.01
2008/0239716 A1 * 10/2008 Lin ........................... F21S 4/26 362/219
2010/0061095 A1 * 3/2010 Hoffmann ............... F21S 8/022 362/249.02
2012/0320595 A1 * 12/2012 Enke ...................... H05B 45/00 257/E33.059
2013/0107526 A1 * 5/2013 Ishibashi ................... F21S 4/26 362/249.04
2016/0138768 A1 * 5/2016 Greene ................... F21V 23/06 29/842
2017/0038036 A1 * 2/2017 Guerrieri .................. F21S 4/24
2020/0284403 A1 * 9/2020 Grave ....................... F21S 4/24

FOREIGN PATENT DOCUMENTS

CN 203656837 U 6/2014
CN 204785614 U 11/2015
CN 206608765 U 11/2017

* cited by examiner

*Primary Examiner* — Christopher E Dunay

(57) ABSTRACT

Disclosed is a LED lighting capable of being bent and twisted at will, which comprises a flexible sleeve, a FPCBA assembly and a lead. The FPCBA assembly is formed by sequentially mounting multiple groups of LED independent circuits on a strip-shaped FPCB by a SMT, a plurality of arc-shaped notches are evenly arranged on long edges of two sides of the FPCB at intervals, a back surface of the FPCB is provided with a positive electrode bonding pad and a negative electrode bonding pad corresponding to each group of LED independent circuits respectively, two leads are provided, and are communicated with all positive electrode bonding pads and all negative electrode bonding pads in a welded mode respectively, and the flexible sleeve wraps and packages the FPCBA assembly and the leads.

15 Claims, 5 Drawing Sheets

LED LIGHTING CAPABLE OF BEING BENT AND TWISTED AT WILL

CROSS REFERENCE TO RELATED APPLICATIONS

This application claims foreign priority of Chinese Patent Application No. 202221570832.3, filed on Jun. 22, 2022 in the China National Intellectual Property Administration, the disclosures of all of which are hereby incorporated by reference.

BACKGROUND OF THE PRESENT INVENTION

There are many types of lighting products in the LED industry. The LED lighting referred to in the present invention is a strip-shaped lighting of uniform light emission with a waterproof shell from the appearance, and because the waterproof shell of the LED lighting is made of a flexible material, such as silica gel and PVC, the LED lighting has certain flexibility. At present, this type of lightings is generally called "silica gel light strip" or "neon light strip" or similar names in the LED industry. The conventional technical solution of this type of products in the industry is a (flexible) FPCBA light strip, electronic components such as a LED lighting, a resistor, a diode, a triode and an IC are arranged on the light strip to realize a current loop through a reasonable electronic wiring diagram, and the FPCBA forms a flexible waterproof shell on a surface of the light strip through co-extrusion, sleeving, glue dripping or glue filling in sleeve, so that different Ingress Protection (IP) levels are reached according to different processes. This type of products is generally used for building edging, city lighting, landscape lighting and the like in the market, and needs linear lighting to achieve the effects of lighting, edging and beautifying, belonging to a type of linear lighting products in the industry. Moreover, at present, linear scene applications of this type of products in the industry in the market mainly comprise linear application, lateral bending plane curve application and top bending plane curve application, and spatial curve application for some products. However, at present, difficulties of industrial products in market application are mainly as follows: 1. the products in spatial curve application have poor mounting reliability, and may easily lead to functional failures such as failed lighting of a section of a product during mounting; and 2. characteristics of the products with the single side bending or top bending plane curve application restrict a mounting behavior to a certain extent, and the products are required to be mounted according to the product characteristics, so that a yield of mounting of the products can be improved, but there are certain limitations in application scenes, and it is still unable to better avoid the phenomenon of mounting failure when there is an installer who does not understand the product characteristics. The application scenes of this type of city edging and lighting products are usually large in scale, so that once there is a functional problem, very troublesome after-sales services may be caused. Therefore, based on the above industry disadvantages, the present invention provides a new product technical solution, which can not only satisfy the bending of side bending and top bending plane curves at the same time, but also distort spatial curves at will to a greater extent to meet the needs of various existing application scenes under the condition of satisfying a bending diameter.

EXPLANATIONS

FPCBA: Flexible Printed Circuit Board Assembly, which refers to a whole manufacturing process of a blank board of a FPCB (Flexible Printed Circuit Board) through loading by a SMT or plugging in by DIP.

SMT: Surface Mounted Technology.

SUMMARY OF PRESENT INVENTION

Aiming at the problems in the prior art, the present invention provides a LED lighting capable of being bent and twisted at will, and aiming at the application defects of existing lighting products of the same type, a lighting structure and a process design are improved, so that the lighting may be bent and twisted in any direction, thus meeting application needs of products in spatial curve modeling, and improving product reliability.

In order to achieve the above object, the technical solution used in the present invention is as follows.

A LED lighting capable of being bent and twisted at will comprises a flexible sleeve, a FPCBA assembly and a lead, wherein the FPCBA assembly is formed by sequentially mounting multiple groups of LED independent circuits on a strip-shaped FPCB by a SMT, a plurality of arc-shaped notches are evenly arranged on long edges of two sides of the FPCB at intervals, a back surface of the FPCB is provided with a positive electrode bonding pad and a negative electrode bonding pad corresponding to each group of LED independent circuits respectively, two leads are provided, one lead is communicated with all positive electrode bonding pads in a welded mode and the other lead is communicated with all negative electrode bonding pads in a welded mode, and the flexible sleeve wraps and packages the FPCBA assembly and the leads, and reserves a power wire at an end portion.

Specifically, the LED independent circuit comprises a plurality of LED luminous elements connected in series and a peripheral electronic element.

Specifically, the arc-shaped notch corresponds to a position between two adjacent LED luminous elements on the FPCB.

Specifically, the FPCB is provided with a cuttable position between each group of LED independent circuits, and a bottom portion of the flexible sleeve is provided with a cuttable window corresponding to the cuttable position.

Specifically, the positive electrode bonding pad and the negative electrode bonding pad on the back surface of the FPCB are also provided with a tin melting space, so as to improve welding reliability of the FPCB and the lead.

Specifically, a top surface of the flexible sleeve corresponding to the LED luminous elements is configured as a light guiding surface, and a side surface and a bottom surface of the flexible sleeve are provided with a light shielding body.

Specifically, the light guiding surface is configured as a serrated optical refracting surface.

Specifically, the flexible sleeve is manufactured by a secondary extrusion process, a transparent material is co-extruded with the FPCBA assembly connected with the leads to form a matrix wrapping the leads and the FPCBA assembly in first extrusion, and the same material is co-extruded with the matrix to form the flexible sleeve with the light guiding surface in second extrusion.

Specifically, one group of exposed cutting extension wires is arranged on the bottom surface of the flexible sleeve by each specified distance, and the cutting extension wires are connected with the leads in the position.

Compared with the prior art, the present invention has the following beneficial effects.

(1) According to the present invention, the arc-shaped notches are arranged on the edge of the FPCB, so that a bending performance of the flexible printed circuit board is improved, so as to ensure that the lighting will not be broken when bent and twisted at will; moreover, the structural design of the positive and negative electrode bonding pads and the lead is skillfully added, so that electric conduction and over-current capabilities of the PFBCA assembly are improved, which can not only expand a main current, achieve a long cascade effect, and have a small brightness difference between a head and a tail when a long-length lighting is mounted, but also ensure electric conductivity of a whole line when a series line in front of the independent circuits is disconnected. The present invention is ingenious in design, simple in structure, convenient to use and high in reliability, and is suitable for an application in a neon light strip.

(2) According to the present invention, the multiple groups of LED independent circuits are arranged on the FPCBA assembly, each group of circuits may be independently conducted, and the FPCB between each group of circuits is provided with the cuttable position and a conducting line, so that each group of circuits may be connected into one complete FPCBA, and may also be detached and cut through the cuttable position to form independent groups.

(3) According to the present invention, the light guiding surface is arranged on the flexible sleeve, so that light emitted by the LED can achieve a corresponding effect, and the light shielding bodies on the side surface and the bottom surface may shield redundant light of other parts to avoid light pollution.

(4) According to the present invention, the flexible sleeve is manufactured by the secondary co-extrusion process, which not only ensures complete packaging of the FPCBA assembly, but also improves a good effect of the light guiding surface on the manufactured flexible sleeve, and also greatly improves an overall mechanical strength of the lighting in coordination with the lead structure.

(5) According to the present invention, the cutting extension wire is arranged in a position by a specified distance, so that a difficulty in handling a wire end caused by cutting by a user is effectively solved, and a power supply may be directly connected through the cutting extension wire after cutting, without needing additional wiring, thus being very convenient.

(6) According to the present invention, the leads are connected with positive and negative electrodes of each group of LED independent circuits on the FPCBA assembly through welding by the bonding pads, so as to realize independent power supply of each unit circuit. In this way, even if the whole FPCBA breaks somewhere, normal work of LEDs of other unit circuits will not be affected.

Figure 1:
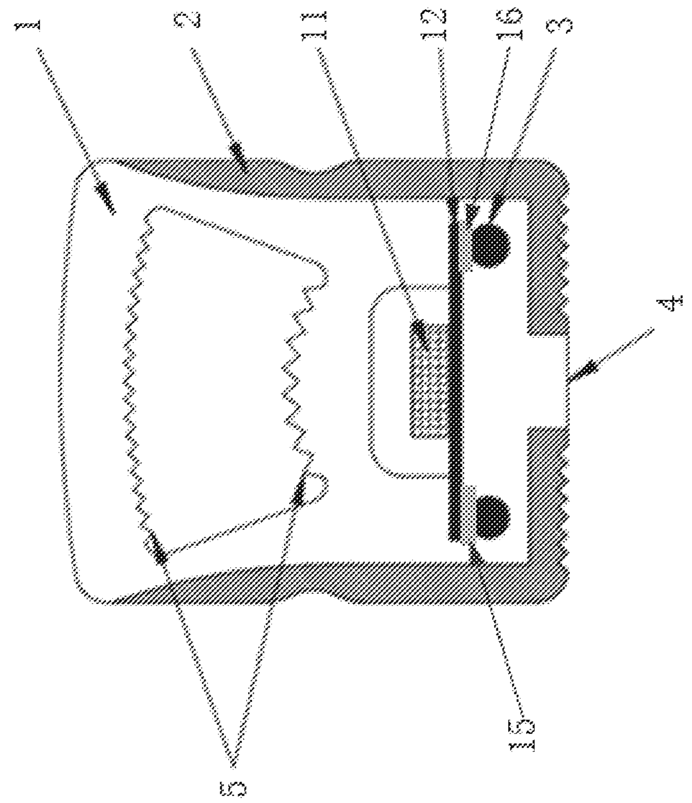
FIG. 1 is a schematic structural diagram of an end surface of an embodiment of the present invention.
Figure 2:
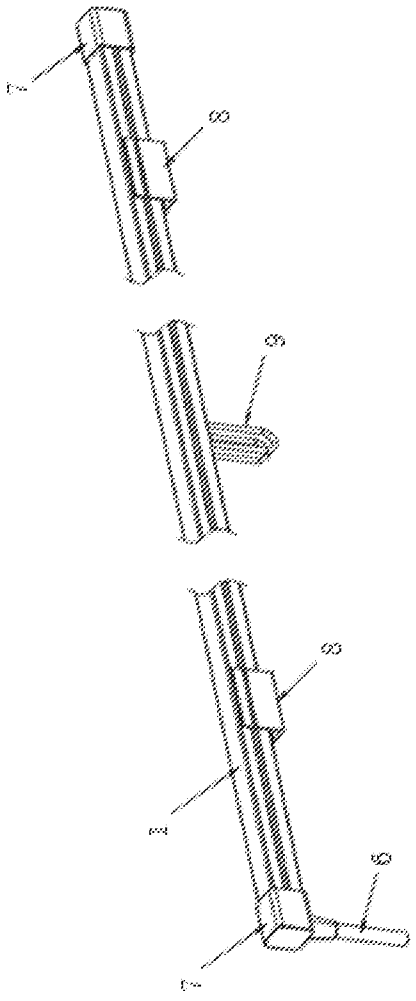
FIG. 2 is a schematic diagram of an overall structure of the embodiment of the present invention.
Figure 3:
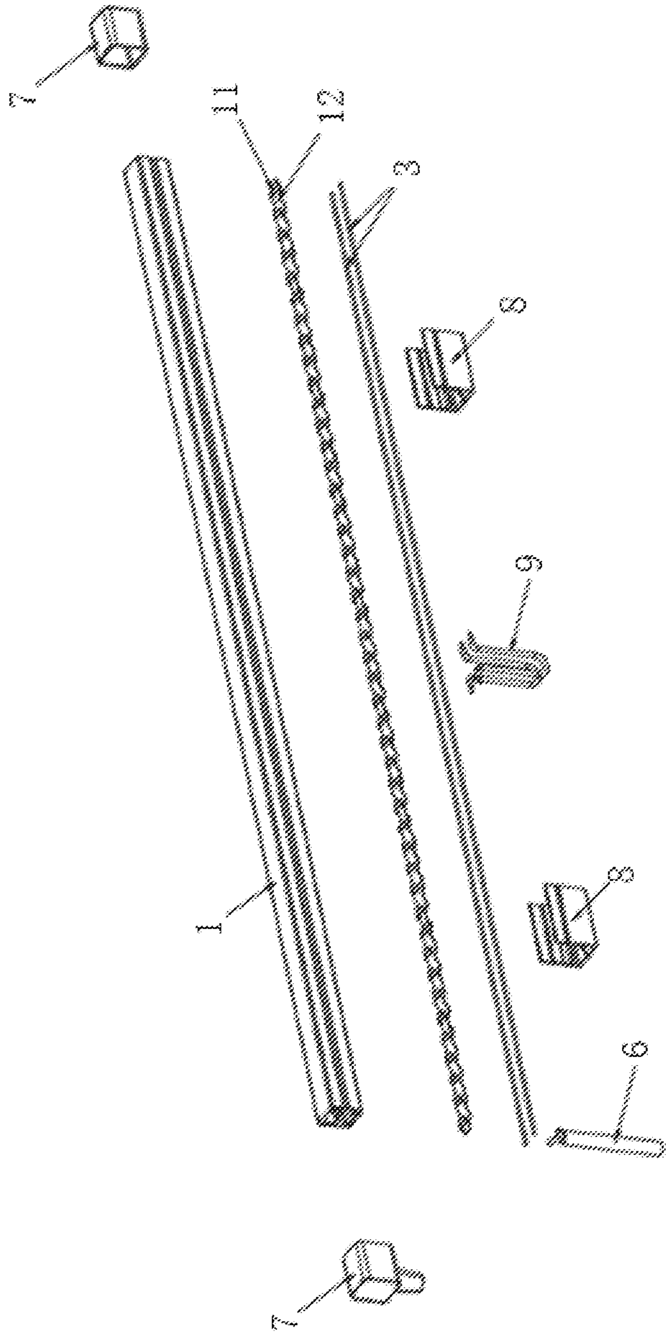
FIG. 3 is an exploded view of the embodiment of the present invention.
Figure 4:
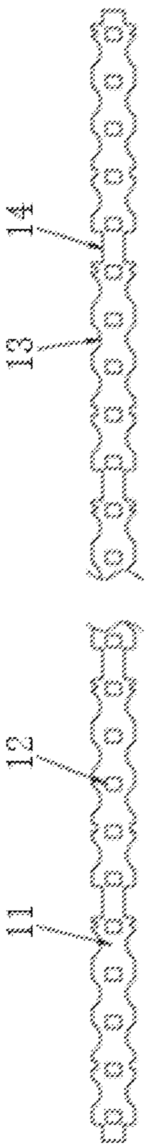
FIG. 4 is a schematic structural diagram of a FPCBA assembly in the embodiment of the present invention.

In the above drawings, the names of parts corresponding to the reference numerals are as follows:

1 refers to flexible sleeve, 2 refers to light shielding body, 3 refers to lead, 4 refers to cuttable window, 5 refers to light guiding surface, 6 refers to power wire, 7 refers to plug, 8 refers to mounting clasp, 9 refers to cutting extension wire, 10 refers to FPCBA assembly, 11 refers to LED independent circuit, 12 refers to FPCB, 13 refers to arc-shaped notch, 14 refers to cuttable position, 15 refers to positive electrode bonding pad, 16 refers to negative electrode bonding pad, 17 refers to matrix, and 18 refers to light diffusing body.

DETAILED DESCRIPTION OF PREFERRED EMBODIMENTS

The present invention is further described hereinafter with reference to the drawings and embodiments, and implementations of the present invention comprise, but are limited to, the following embodiments.

Embodiment

Figure 5:
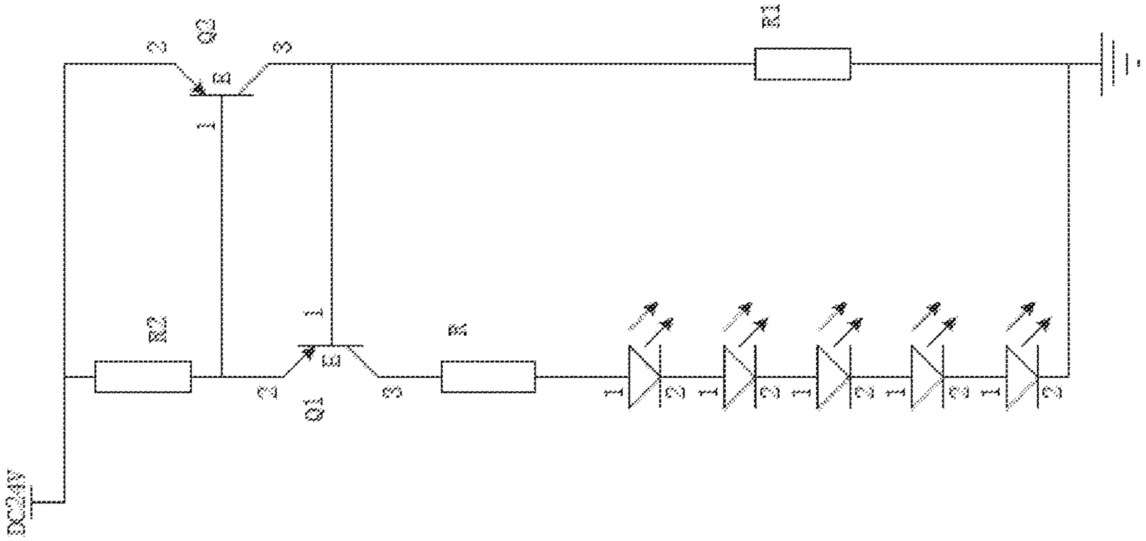
FIG. 5 is a schematic diagram of a LED independent circuit in the embodiment of the present invention.
Figure 6:
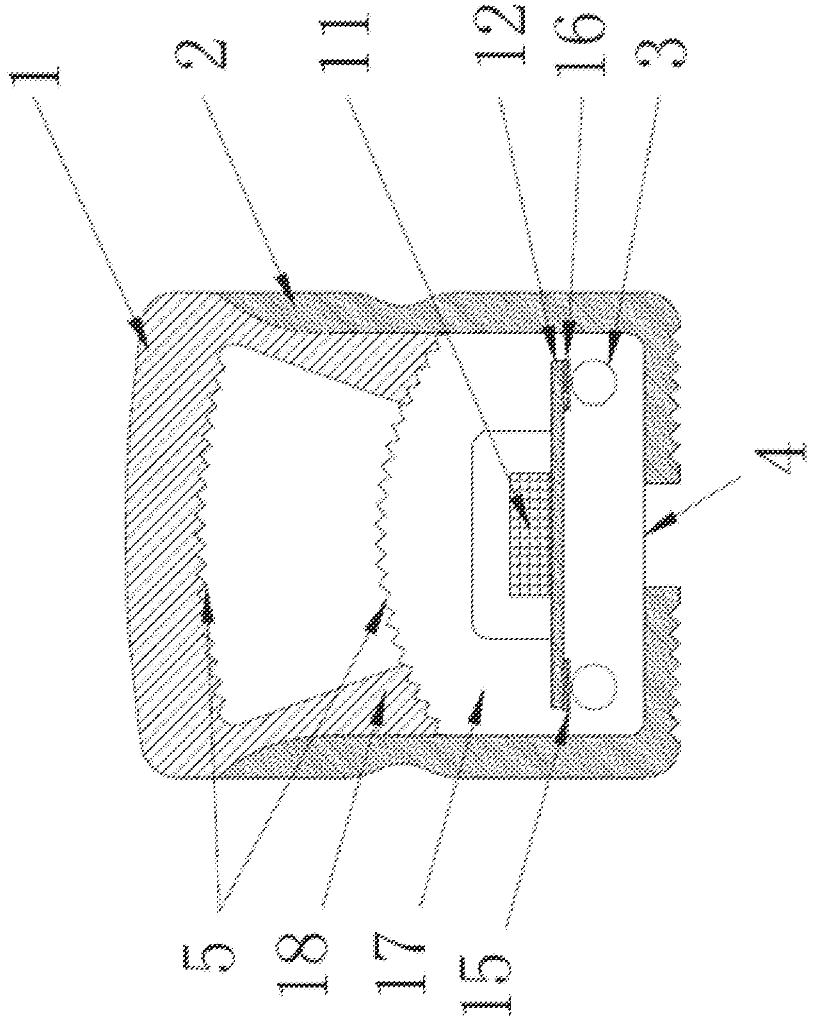
FIG. 6 is a schematic structural diagram of formation by extrusion twice with different materials in the embodiment of the present invention.

As shown in FIG. 1 to FIG. 5, a LED lighting capable of being bent and twisted at will comprises a flexible sleeve 1, a FPCBA assembly 10 and a lead 3. The FPCBA assembly is formed by sequentially mounting multiple groups of LED independent circuits 11 on a strip-shaped FPCB 12 by a SMT, a plurality of arc-shaped notches 13 are evenly arranged on long edges of two sides of the FPCB at intervals, and each arc-shaped notch corresponds to a position between two adjacent LED luminous elements on the FPCB respectively, so as to ensure that the FPCB may be bent and twisted at will. The LED independent circuit comprises a plurality of LED luminous elements connected in series and a peripheral electronic element, as shown in FIG. 5. A conducting line is arranged between each group of LED independent circuits on the FPCB, so that the FPCBA assembly forms one complete FPCBA. A back surface of the FPCB is provided with a positive electrode bonding pad 15 and a negative electrode bonding pad 16 corresponding to each group of LED independent circuits respectively, two leads are provided, one lead is communicated with all positive electrode bonding pads in a welded mode and the other lead is communicated with all negative electrode bonding pads in a welded mode, and the positive and negative electrode bonding pads are also provided with a tin melting space, so as to improve welding reliability of the FPCB and the lead. The welded connection mode of the lead and the FPCB expands a main current, thus achieving a long cascade effect, and having a small brightness difference between a head and a tail when a long-length lighting is configured (for example, a conventional flexible light strip can have no obvious brightness difference within a length range of 15 m at most, while the LED lighting of the present invention can have no obvious brightness difference within a length range of 30 m under the configuration of the same electrical elements), and the configuration of welding the leads with the LED independent circuits also ensures overall connectivity and electric conductivity of the FPCBA assembly, and greatly improves a mechanical strength of the lighting itself. Even if a cuttable position between each group of independent circuits is disconnected, the independent circuits can be conducted through the leads respectively. Specifically, the FPCB is provided with the cuttable position 14 between each group of LED independent circuits, and a bottom portion of the flexible sleeve is provided with a cuttable window 4 corresponding to the cuttable position, so that cutting may be performed conveniently according to a required length, and adaptability to a mounting scene is improved. The flexible sleeve wraps and packages the FPCBA assembly and the leads, and reserves a power wire 6 at an end portion, wherein a top surface of the flexible sleeve corresponding to the LED luminous elements is configured as a light guiding surface 5, and the light guiding surface is a serrated optical refracting surface, so as to ensure that emitted light achieves a linear effect and forms required light diffusing effect or light focusing effect, and a side surface and a bottom surface of the flexible sleeve are provided with a light shielding body 2 to reduce light source leakage. The flexible sleeve is specifically manufactured by a secondary extrusion process, a transparent material is co-extruded with the FPCBA assembly connected with the leads to form a matrix 17 wrapping the leads and the FPCBA assembly in first extrusion, and a transparent material or a light diffusing material is co-extruded with the matrix to form the flexible sleeve with the light guiding surface in second extrusion, so as to realize packaging. As shown in FIG. 1, a middle part of the flexible sleeve is integrated by extrusion twice with the same material, and as shown in FIG. 6, the middle part of the flexible sleeve is layered by extrusion twice with different materials, wherein the first extrusion forms the light guiding surface on the surface of the matrix 17, and the light diffusing material of the second extrusion forms a light diffusing body 18 with the light guiding surface inside. Plugs 7 are arranged at two ends after packaging, and the power wire is led out from the plugs to finish the whole product, so that an IP67 ingress protection level can be reached, and the product may be provided with a mounting clasp 8 to facilitate mounting.

In further configuration, one group of exposed cutting extension wires 9 is arranged on the bottom surface of the flexible sleeve by each specified distance, and the cutting extension wires are connected with the leads in the position. A part of colloid may be cut off in a position on the bottom surface after packaging to bridge the cutting extension wire to the lead in manufacturing, so as to facilitate a user to replenish power or access a power supply after cutting.

The above embodiments are only the preferred embodiments of the present invention, and do not limit the scope of protection of the present invention. However, any changes made by adopting the design principle of the present invention and performing non-creative work on this basis should be within the scope of protection of the present invention.

The invention claimed is:

1. A LED lighting capable of being bent and twisted at will, comprising a flexible sleeve, a FPCBA assembly and two leads; wherein the FPCBA assembly is formed by sequentially mounting multiple groups of LED independent circuits on a strip-shaped FPCB by a SMT; a plurality of arc-shaped notches are evenly arranged on long edges of two sides of the FPCB at intervals; a back surface of the FPCB is provided with a positive electrode bonding pad and a negative electrode bonding pad corresponding to each group of LED independent circuits respectively; one of the two leads is communicated with all positive electrode bonding pads in a welded mode and the other one of the two leads is communicated with all negative electrode bonding pads in a welded mode, and the flexible sleeve wraps and packages the FPCBA assembly and the leads, and reserves a power wire at an end portion;

wherein the FPCB is provided with a cuttable position between each group of LED independent circuits, and a bottom portion of the flexible sleeve is provided with a window corresponding to the cuttable position and allowing the cuttable position to be visible.

2. The LED lighting capable of being bent and twisted at will according to claim 1, wherein the LED independent circuit comprises a plurality of LED luminous elements connected in series and a peripheral electronic element.

3. The LED lighting capable of being bent and twisted at will according to claim 2, wherein the arc-shaped notch corresponds to a position between two adjacent LED luminous elements on the FPCB.

4. The LED lighting capable of being bent and twisted at will according to claim 3, wherein one group of exposed cutting extension wires is arranged on the bottom surface of the flexible sleeve by each specified distance, and the cutting extension wires are connected with the leads in the position.

5. The LED lighting capable of being bent and twisted at will according to claim 2, wherein one group of exposed cutting extension wires is arranged on the bottom surface of the flexible sleeve by each specified distance, and the cutting extension wires are connected with the leads in the position.

6. The LED lighting capable of being bent and twisted at will according to claim 1, wherein the positive electrode bonding pad and the negative electrode bonding pad on the back surface of the FPCB are also provided with a tin melting space.

7. The LED lighting capable of being bent and twisted at will according to claim 6, wherein one group of exposed cutting extension wires is arranged on the bottom surface of the flexible sleeve by each specified distance, and the cutting extension wires are connected with the leads in the position.

8. The LED lighting capable of being bent and twisted at will according to claim 1, wherein a top surface of the flexible sleeve corresponding to the LED luminous elements is configured as a light guiding surface, and a side surface and a bottom surface of the flexible sleeve are provided with a light shielding body.

9. The LED lighting capable of being bent and twisted at will according to claim 8, wherein the light guiding surface is configured as a serrated optical refracting surface.

10. The LED lighting capable of being bent and twisted at will according to claim 9, wherein one group of exposed cutting extension wires is arranged on the bottom surface of the flexible sleeve by each specified distance, and the cutting extension wires are connected with the leads in the position.

11. The LED lighting capable of being bent and twisted at will according to claim 8, wherein the flexible sleeve is manufactured by a secondary extrusion process, a transparent material is co-extruded with the FPCBA assembly connected with the leads to form a matrix wrapping the leads and the FPCBA assembly in first extrusion, and a transparent material or a light diffusing material is co-extruded with the matrix to form the flexible sleeve with the light guiding surface in second extrusion.

12. The LED lighting capable of being bent and twisted at will according to claim 11, wherein one group of exposed cutting extension wires is arranged on the bottom surface of the flexible sleeve by each specified distance, and the cutting extension wires are connected with the leads in the position.

13. The LED lighting capable of being bent and twisted at will according to claim 8, wherein one group of exposed cutting extension wires is arranged on the bottom surface of the flexible sleeve by each specified distance, and the cutting extension wires are connected with the leads in the position.

14. The LED lighting capable of being bent and twisted at will according to claim 1, wherein one group of exposed cutting extension wires is arranged on the bottom surface of the flexible sleeve by each specified distance, and the cutting extension wires are connected with the leads in the position.

15. The LED lighting capable of being bent and twisted at will according to claim 1, wherein one group of exposed cutting extension wires is arranged on the bottom surface of the flexible sleeve by each specified distance, and the cutting extension wires are connected with the leads in the position.

* * * * *